United States Patent
Kirby

(10) Patent No.: US 10,722,982 B2
(45) Date of Patent: Jul. 28, 2020

(54) METHOD OF FORMING A HOLE IN A COATED COMPONENT

(71) Applicant: General Electric Company, Schenectady, NY (US)

(72) Inventor: Glen Harold Kirby, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 15/668,151

(22) Filed: Aug. 3, 2017

(65) Prior Publication Data

US 2019/0039186 A1 Feb. 7, 2019

(51) Int. Cl.
*B05D 3/00* (2006.01)
*F23R 3/00* (2006.01)
(Continued)

(52) U.S. Cl.
CPC .......... *B23K 26/389* (2015.10); *B05D 3/007* (2013.01); *B05D 3/0254* (2013.01); *B05D 5/005* (2013.01); *B23K 26/16* (2013.01); *B23K 26/402* (2013.01); *B23P 13/00* (2013.01); *B23P 25/00* (2013.01); *F01D 5/186* (2013.01); *F01D 5/288* (2013.01); *F23R 3/002* (2013.01); *F23R 3/007* (2013.01); *B05D 2350/63* (2013.01); *B23K 2101/001* (2018.08); *B23K 2103/172* (2018.08); *B23K 2103/52* (2018.08); *B23P 15/02* (2013.01); *B23P 15/04* (2013.01); *F01D 5/12* (2013.01); *F01D 9/04* (2013.01); *F01D 25/002* (2013.01); *F01D 25/08* (2013.01); *F05D 2220/32* (2013.01); *F05D 2230/10* (2013.01); *F05D 2230/13* (2013.01); *F05D 2230/22* (2013.01); *F05D 2240/11* (2013.01); *F05D 2260/202* (2013.01); *F05D 2300/15* (2013.01);
(Continued)

(58) Field of Classification Search
CPC .......... B23P 15/02; B23P 15/04; B23P 13/00; B23P 25/00; Y10T 29/49341; F23R 3/007; F05D 2230/13; F05D 2300/6033; B23K 26/389; B23K 26/16; B05D 3/007; B05D 3/0254; B05D 5/005; B05D 2350/63; F01D 5/186; F01D 5/288; F01D 25/002

See application file for complete search history.

(56) References Cited

U.S. PATENT DOCUMENTS 4,726,104 A 2/1988 Foster et al.
5,286,688 A 2/1994 Saito et al.
(Continued)

*Primary Examiner* — Jermie E Cozart
(74) *Attorney, Agent, or Firm* — Dority & Manning, P.A.

(57) ABSTRACT

Methods for forming a hole in a coated component are provided. The method may include forming a sacrificial layer over a ceramic barrier coating of a substrate, drilling a hole into the coated component such that any spatter formed during drilling deposits onto the sacrificial layer, and removing the sacrificial layer along with the spatter deposited thereon. The sacrificial layer may include a rare earth oxide (e.g., rare earth oxide particles). Intermediate ceramic matrix composite (CMC) component are also provided. The intermediate CMC may include a CMC body, an environmental barrier coating on the bond coating, and a sacrificial layer on the environmental barrier coating, with the sacrificial layer including particles of a rare earth oxide dispersed in a polymeric matrix.

13 Claims, 2 Drawing Sheets

(51) Int. Cl.
  *F01D 5/28* (2006.01)
  *F01D 5/18* (2006.01)
  *B05D 5/00* (2006.01)
  *B23P 13/00* (2006.01)
  *B23P 25/00* (2006.01)
  *B23P 15/04* (2006.01)
  *F01D 25/00* (2006.01)
  *B23K 26/382* (2014.01)
  *B23K 26/402* (2014.01)
  *B23K 26/16* (2006.01)
  *B05D 3/02* (2006.01)
  *F01D 5/12* (2006.01)
  *F01D 9/04* (2006.01)
  *F01D 25/08* (2006.01)
  *B23K 101/00* (2006.01)
  *B23K 103/00* (2006.01)
  *B23K 103/16* (2006.01)
  *B23P 15/02* (2006.01)

(52) U.S. Cl.
  CPC ............... *F05D 2300/6033* (2013.01); *F23R 2900/00018* (2013.01); *F23R 2900/03042* (2013.01); *Y10T 29/49341* (2015.01)

(56) References Cited

U.S. PATENT DOCUMENTS

| | | |
|---|---|---|
| 6,002,478 A | 12/1999 | Zhu |
| 6,224,361 B1 | 5/2001 | Reed et al. |
| 6,573,474 B1 * | 6/2003 | Loringer ............ B23K 26/384 219/121.71 |
| 7,229,600 B2 | 6/2007 | Yadav |
| 7,507,482 B2 | 3/2009 | Bruce et al. |
| 2016/0250725 A1 | 9/2016 | Henderkott et al. |
| 2016/0333458 A1 | 11/2016 | Haupt et al. |

* cited by examiner

METHOD OF FORMING A HOLE IN A COATED COMPONENT

FIELD OF TECHNOLOGY

The present invention relates generally to ceramic matrix turbine components, and more particularly, to ceramic matrix composite components for gas turbine engines having small complex features.

BACKGROUND

In order to increase the efficiency and the performance of gas turbine engines so as to provide increased thrust-to-weight ratios, lower emissions and improved specific fuel consumption, engine turbines are tasked to operate at higher temperatures. The higher temperatures reach and surpass the limits of the material of the components in the hot section of the engine and in particular the turbine section of the engine. Since existing materials cannot withstand the higher operating temperatures, new materials for use in high temperature environments need to be developed.

Ceramic matrix composites have been developed as substitutes for the high temperature alloys. The ceramic matrix composites (CMCs) in many cases provide an improved temperature and density advantage over metals, making them the material of choice when higher operating temperatures and/or reduced weight are desired. CMCs have relatively low thermal conductivities and are thus well suited for use in high temperature environments for long periods of time.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials. As such, CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Additionally, CMC components in the hot gas are film cooled, particularly in components for use within the hot gas path. For example, film holes may be formed in the CMC component via laser drilling. However, this laser drilling results in deposition of silicon liquid metal "splatter" on the surface of the EBC, which upon freezing, undergoes volume expansion of silicon and subsequently damages the EBC coating.

As such, a need exists for an improved method of forming holes (e.g., film cooling holes) in a coated CMC component.

BRIEF DESCRIPTION

Aspects and advantages will be set forth in part in the following description, or may be obvious from the description, or may be learned through practice of the invention.

Methods are generally provided for forming a hole in a coated component. In one embodiment, the method includes forming a sacrificial layer over a ceramic barrier coating of a substrate, drilling a hole into the coated component such that any spatter formed during drilling deposits onto the sacrificial layer, and removing the sacrificial layer along with the spatter deposited thereon. The sacrificial layer may include a rare earth oxide (e.g., rare earth oxide particles).

Intermediate ceramic matrix composite (CMC) component are also generally provided, which may be formed during the method of forming the hole. In one embodiment, the intermediate CMC may include a CMC body, an environmental barrier coating on the bond coating, and a sacrificial layer on the environmental barrier coating, with the sacrificial layer including particles of a rare earth oxide dispersed in a polymeric matrix.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
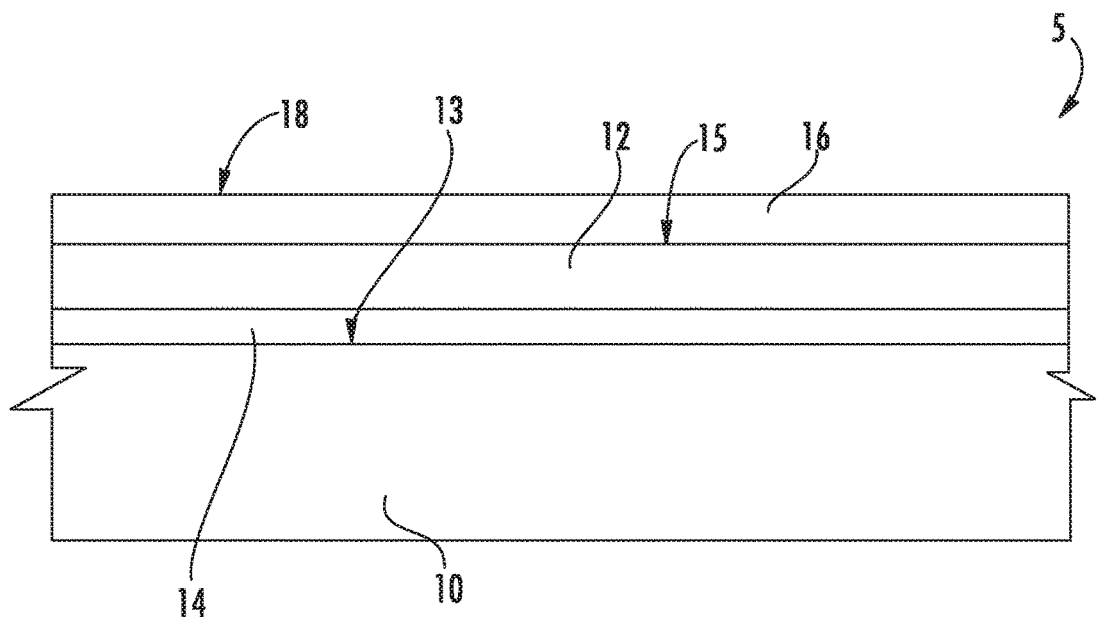
FIG. 1 shows an exemplary intermediate CMC component having a sacrificial layer on the EBC.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

Methods are generally provided for forming a hole in coated component. In particular embodiments, methods are provided for drilling a hole in coated component having a ceramic barrier coating thereon. The methods include the use of a sacrificial layer on the ceramic barrier coating to protect the ceramic barrier coating from spatter (including recast material formed from drilling and/or other deposits formed during the drilling process). After drilling of the hole(s), the sacrificial layer may be removed along with any spatter deposited thereon. Additionally, the material of the sacrificial layer can be selected to be compatible with the underlying ceramic barrier coating such that any residual sacrificial layer on the ceramic barrier coating is prevented from un-intended chemical interaction or other damage to the ceramic barrier coating.

Although described below with respect to environmental barrier coating (EBC) coatings on a CMC substrate, it is to be understood that the present teachings apply equally to thermal barrier coatings (TBC) on a metal substrate, where the TBC includes a rare earth oxide. That is, the sacrificial layer that includes rare earth oxide particles may be used over a TBC formed from rare earth materials on a metal substrate. The term "ceramic barrier coating" encompasses both TBCs and EBCs, and may generally be formed from a rare earth oxide.

FIG. 1 shows a coated CMC component 5 that includes a CMC substrate 10 with an EBC 12 over its first surface 11. The CMC substrate 10 may be formed from a CMC material (e.g., a silicon based, non-oxide ceramic matrix composite). As used herein, "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. For example, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates. As used herein, "monolithic ceramics" refers to materials comprising only silicon carbide, only silicon nitride, only alumina, only silica, or only mullite. Herein, CMCs and monolithic ceramics are collectively referred to as "ceramics."

An EBC 12 is particularly suitable for use on CMC substrates 10 found in high temperature environments, such as those present in gas turbine engines, for example, combustor components, turbine blades, shrouds, nozzles, heat shields, and vanes. Although shown as a single layer in FIGS. 1-3, the EBC 12 can be formed from multiple layers, a barrier layer, a transition layer, a hermetic layer. If present, the hermetic layer may include rare earth disilicates, mullite, barium strontium aluminosilicate (BSAS) and/or combinations thereof. Such a hermetic layer prevents penetration of high temperature water vapor but may have limited to no CMAS mitigation capability. If present, a transition layer may be present in the EBC 12. The transition layer may comprise rare earth elements (Ln), rare earth oxides, zirconia, hafnia, hafnia partially or fully stabilized with alkaline earth or rare earth elements, zirconia partially or fully stabilized with alkaline earth or rare earth elements, rare earth hafnates, rare earth zirconates, rare earth monosilicates, alumina, cordierite, and/or combinations thereof. Such a transition layer prevents reaction between adjacent layers in an EBC system stack, may provide limited to no protection against penetration of high temperature water vapor, and may or may not have CMAS mitigation capability. Additionally, an abradable layer may be included to serve as an abradable layer on the EBC 12. Such an abradable layer, can be BSAS or rare earth disilicate (e.g. ytterbium disilicate or $Yb_2Si_2O_7$) where the abradable layer is the outermost layer.

As stated, the coated substrate 5 can be utilized as a turbine component for a gas turbine. In particular, the turbine component can be a CMC component 5 positioned within a hot gas flow path of the gas turbine such that the coating forms an environmental barrier coating on the component to protect the component within the gas turbine when exposed to the hot gas flow path.

A bond coating 14 is shown between the CMC substrate 10 and the EBC 12. As shown, the bond coating 14 is directly on the first surface 13 of the CMC substrate 10, and the EBC 12 is directly on the bond coating 14. In particular embodiments, the bond coating 14 may include silicon (e.g., a layer of silicon metal).

A sacrificial layer 16 is on an outer surface 15 of the EBC 12. In the embodiment shown, the sacrificial layer 16 is directly on the outer surface 15 of the EBC 12. Generally, the sacrificial layer 16 forms an external surface over the EBC 12 so as to protect it from spatter during the drilling process.

The sacrificial layer 16 generally includes a thin layer of rare earth oxide particles (e.g., the top layer of the EBC 12). Rare earth oxide particles are partially soluble in water, and thus it is easy to wash them away after the drilling process is complete. However, since residual rare earth oxide is often difficult to clean away, the rare earth oxide particles are compatible with the underlying EBC 12. In particular embodiments, the rare earth oxide particles of the sacrificial layer 16 are selected to be compatible with the EBC 12, such as including the same rare earth element(s). For example, in embodiments where the EBC 12 include yttrium (e.g., $Y_2SiO_5$ and/or $Yb_2Si_2O_7$), the rare earth oxide particles of the sacrificial layer 16 may include yttrium oxide (e.g., $Y_2O_3$ particles). The use of rare earth oxides within the sacrificial layer 16 does not introduce deleterious contaminants to the coating, such as calcium.

The sacrificial layer 16 may be formed on the EBC 12 to have a thickness of about 1 μm to about 250 μm (e.g., about 10 μm to about 100 μm) to ensure that the EBC 12 is sufficiently covered. In one embodiment, the sacrificial layer 16 may be formed over the entire surface 15 of the EBC 12 (e.g., forming a substantially continuous layer over the EBC 12). However, in other embodiments, the sacrificial layer 16 may be formed only over portions of the component 5 that is to be drilled.

In one embodiment, the rare earth oxide particles of the sacrificial layer 16 may be applied via slurry deposition, such as using a slurry of the rare earth oxide particles in a liquid carrier (e.g., water). In one embodiment, a polymeric binder may also be included in the slurry such that it may form a polymeric matrix upon drying to hold the rare earth oxide particles on the surface as the sacrificial layer. For example, the binder can be water dispersible latex (e.g., polystyrene latex, polyvinyl acetate, styrene-butadiene, silicone, polymethylmethacrylate, etc.). Such a sacrificial layer may then be removed using a grit blaster. Alternatively, the binder may be a soluble binder so as to allow washing/rinsing of the sacrificial layer 16 using a solvent system. For example, the binder may be a water soluble polymeric material, such as polyvinyl pyrolidone, polyethylene oxide, polyvinyl alcohol, etc. which may be washed away with an aqueous solvent (e.g., water). Alternatively, organic soluble material may include ethyl cellulose, polyvinyl butyral, etc. which may be washed away using an organic based solvent that solublizes the polymeric binder. The sacrificial layer 16 is generally formed after sintering of the TBC, such that the sacrificial layer 16 remains unsintered prior to drilling.

Figure 2:
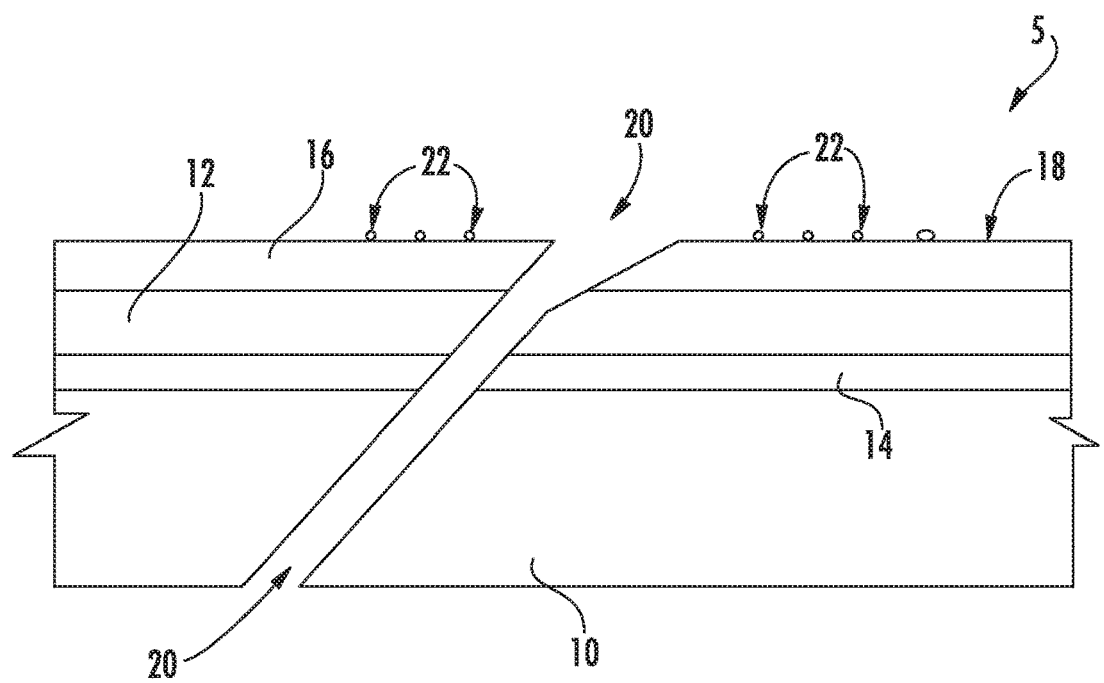
FIG. 2 shows an exemplary CMC component formed by drilling a hole into the exemplary intermediate CMC component of FIG. 1 with spatter depositing on the sacrificial layer.

Referring to FIG. 2, the coated component 5 is shown having a hole 20 formed therein. For example, the hole 20 may be formed via drilling (e.g., laser drilling, mechanical drilling, electron beam drilling, etc.) from either side of the component 5. In particular embodiments where the coated component 5 is a CMC component, the hole 20 may be a film hole(s) produced with a pulsing laser using a continuous helical motion to produce the desired shape, and may optionally be followed by the use of a percussion drill to produce the meter. For example, the laser drilling process can utilize a Nd:YAG laser, although any other laser that is adaptable to produce the desired results may be used. The laser produce film holes 20 having, in particular embodiments, a predetermined metering diameter D (e.g., from about 0.010 to about 0.030 inches). Additionally, the apertures may be drilled relative to the surface 15 at an angle commensurate to produce a centerline angle (e.g., about 150° to about 50°).

The laser energy is generally sufficient to melt the SiC or SiN matrix material immediately adjacent to it. The progression of the drilling operation occurs so quickly that the melted material flows only a short distance before re-solidifying along the newly created surface as recast material as the pressurized air from the laser nozzle assists in cooling it. The recast material is substantially silica that forms an oxidation barrier along the surface of the newly created aperture so that deterioration of the CMC material along this surface will not occur as cooling air is introduced into the passage.

In one particular embodiment, the hole 20 may be formed by drilling through the sacrificial layer 16, the EBC 12, the bond coat 14, and through the CMC substrate 10. During the drilling process, material from any of these layers (e.g., the EBC 12 and/or the bond coat 14) and/or the CMC substrate 10 (e.g., residual silicon from a melt-infiltrated CMC substrate 10) may be recast and deposited on the surface 18 of the sacrificial layer 16 forming spatter 22 thereon. For example, silicon in the bond coating 14 may be temporarily liquefied during the drilling process and sprayed onto the areas of the surface 18 surrounding the resulting hole 20. As such, any spatter 22 from the drilling process may be deposited onto the sacrificial layer 16, protecting the underlying EBC 12.

Figure 3:
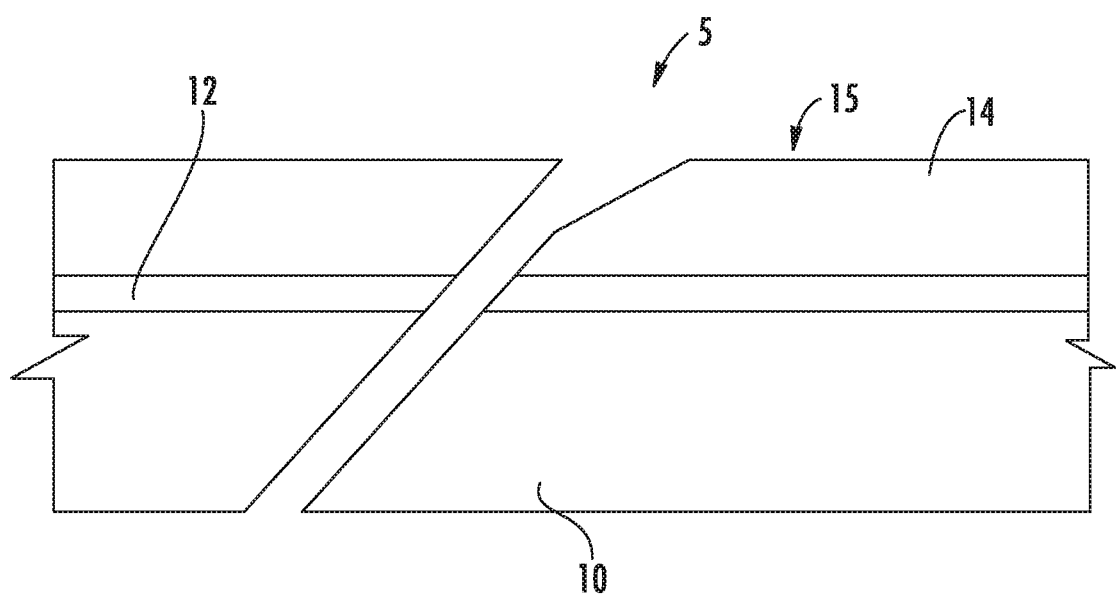
FIG. 3 shows the exemplary CMC component of FIG. 2 after removing the sacrificial layer from the exemplary intermediate CMC component, along with the spatter thereon.

Then, the sacrificial layer 16 may be removed, since it is not sintered, along with any spatter 22 on its surface 18. For example, the sacrificial layer 16 may be washed away from the surface 15 of the EBC 14 using a liquid wash. In particular embodiments, the liquid wash may include the same solvents of the slurry utilized to deposit the sacrificial layer 16 (e.g., water). In certain embodiments, the sacrificial layer 16 could be blasted or grinded away, such as using a light grit (e.g., walnut shells, plastic beads, etc.). FIG. 3 shows the resulting component 5 having a hole 20 drilled therethrough, and with the sacrificial layer 16 removed from the EBC 14. Thus, FIGS. 1-3 sequentially show an EBC coated CMC component during an exemplary method of forming a hole therein.

The coated CMC component is particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the coating system forms an environmental barrier for the underlying substrate to protect the component within the gas turbine when exposed to the hot gas flow path.

Figure 4:
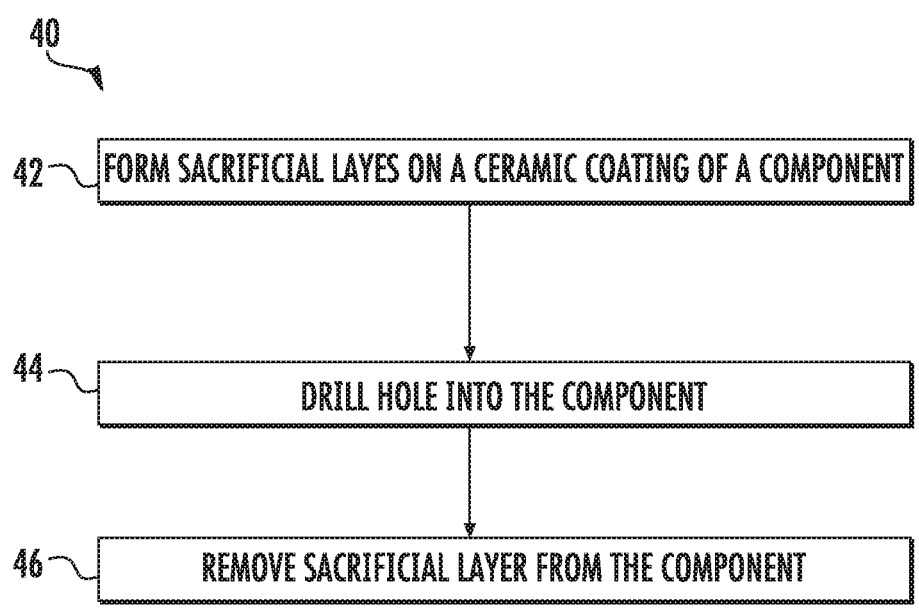
FIG. 4 shows a diagram of an exemplary method of forming a CMC component.

FIG. 4 shows an exemplary method 40 of forming a hole in a coated component. In the embodiment shown, the method 40 includes forming a sacrificial layer over a ceramic barrier coating of a substrate at 42. For instance, the sacrificial layer may include a rare earth oxide. The method 40 also includes drilling a hole into the coated component at 44, such that any spatter formed during drilling deposits onto the sacrificial layer. At 46, the sacrificial layer is removed from the component along with the spatter deposited thereon.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a hole in a coated component, the method comprising:
    forming a sacrificial layer over a ceramic barrier coating of a substrate, wherein the sacrificial layer comprises a rare earth oxide;
    after forming the sacrificial layer, drilling a hole into the coated component such that any spatter formed during drilling deposits onto the sacrificial layer; and
    after drilling the hole, removing the sacrificial layer along with the spatter deposited thereon.

2. The method of claim 1, wherein the rare earth oxide comprises yttrium oxide.

3. The method of claim 1, wherein the sacrificial layer is formed on the ceramic barrier coating after sintering of the ceramic barrier coating such that the sacrificial layer remains unsintered.

4. The method of claim 1, wherein the sacrificial layer is formed by applying a slurry onto the ceramic barrier coating.

5. The method of claim 4, wherein the slurry comprises particles of the rare earth oxide and a liquid carrier.

6. The method of claim 5, wherein the slurry is dried to remove the liquid carrier and leaving the particles of the rare earth oxide.

7. The method of claim 4, wherein the slurry comprises particles of the rare earth oxide, a polymeric binder, and a liquid carrier.

8. The method of claim 1, wherein the sacrificial layer and the spatter are removed using a liquid wash.

9. The method of claim 8, wherein the liquid wash comprises water.

10. The method of claim 1, wherein the sacrificial layer is formed to a thickness of about 1 μm to about 250 μm.

11. The method of claim 1, wherein the sacrificial layer is formed to a thickness of about 10 μm to about 100 μm.

12. The method of claim 1, wherein the sacrificial layer is substantially continuous over the ceramic barrier coating.

13. A method of forming a hole in a ceramic matrix composite (CMC) component, the method comprising:
   providing an intermediate CMC component comprising:
      a CMC body;
      an environmental barrier coating on the CMC body; and
      a sacrificial layer on the environmental barrier coating, wherein the sacrificial layer comprises particles of a rare earth oxide dispersed in a polymeric matrix;
   drilling a hole into the intermediate CMC component, including the sacrificial layer, such that any spatter formed during drilling deposits onto the sacrificial layer; and
   after drilling the hole, removing the sacrificial layer along with the spatter deposited thereon.

* * * * *